United States Patent [19]

Ito et al.

[11] Patent Number: 5,140,522
[45] Date of Patent: Aug. 18, 1992

[54] METHOD AND APPARATUS FOR MACHINE TRANSLATION UTILIZING PREVIOUSLY TRANSLATED DOCUMENTS

[75] Inventors: Etsuo Ito, Yokohama; Koichi Hasebe, Kawasaki; Kimihito Takeda, Odawara; Shinya Amano, Ayase, all of Japan

[73] Assignee: Kabushiki Kaisha Toshiba, Kawasaki, Japan

[21] Appl. No.: 427,349

[22] Filed: Oct. 27, 1989

[30] Foreign Application Priority Data

Oct. 28, 1988 [JP] Japan .................................. 63-270739
Mar. 13, 1989 [JP] Japan .................................... 1-60044
Mar. 14, 1989 [JP] Japan .................................... 1-59710

[51] Int. Cl.$^5$ ................................................. G06F 15/38
[52] U.S. Cl. ................................................... 364/419
[58] Field of Search ........................ 364/419, 900, 200

[56] References Cited

U.S. PATENT DOCUMENTS

| | | | |
|---|---|---|---|
| 4,381,551 | 4/1983 | Kanou et al. | 364/900 |
| 4,412,305 | 10/1983 | Yoshida | 364/419 |
| 4,438,505 | 3/1984 | Yanagiuchi et al. | 364/419 |
| 4,706,212 | 11/1987 | Toma | 364/900 |
| 4,833,610 | 5/1989 | Zamora et al. | 364/419 |
| 4,931,936 | 6/1990 | Kugimiya et al. | 364/419 |

OTHER PUBLICATIONS

Sumita et al., "Translation Aid System Using Flexible Text Retrieval Based on Syntax Matching", Japan IBM Corp. Tokyo research laboratory, The 37th (1987 Second Half), National Meeting of the Information Processing Society.

Nakamura, "Sample Retrieving Translation Support System", Fujitsu Laboratories, Ltd., The 38th (1989 First Half), National Meeting of the Information Processing Society.

Sumita et al., "A Translation Aid System Flexible Text Retrieval Based on Syntax-Matching," Proc. of 37th Information Processing Society of Japan, 1988, pp. 978-979.

Nakamura, "Translation Support by Retrieving Bilingual Texts," Proc. of 38th Information Processing Society of Japan, 1989, pp. 357-358.

Primary Examiner—Dale M. Shaw
Assistant Examiner—Xuong Chung
Attorney, Agent, or Firm—Foley & Lardner

[57] ABSTRACT

A method and apparatus for machine translation of a language capable of dealing efficiently with situations which conventionally required repetitions of similar translations, including the steps of: searching, for each new original document to be translated, the stored original documents which are utilizable in translation of the new original document to be translated; and translating the new original document to be translated by utilizing the stored translated documents corresponding to the stored original document found by the search.

14 Claims, 21 Drawing Sheets

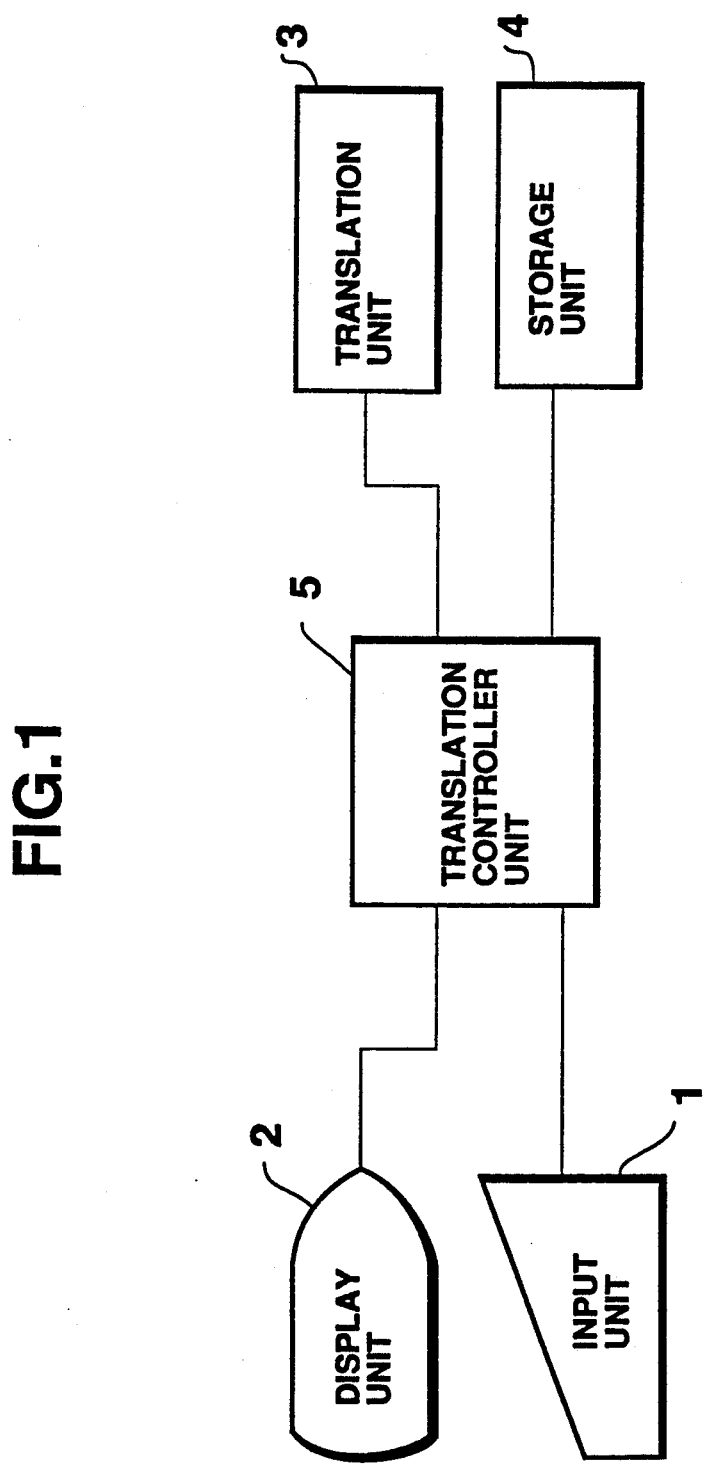

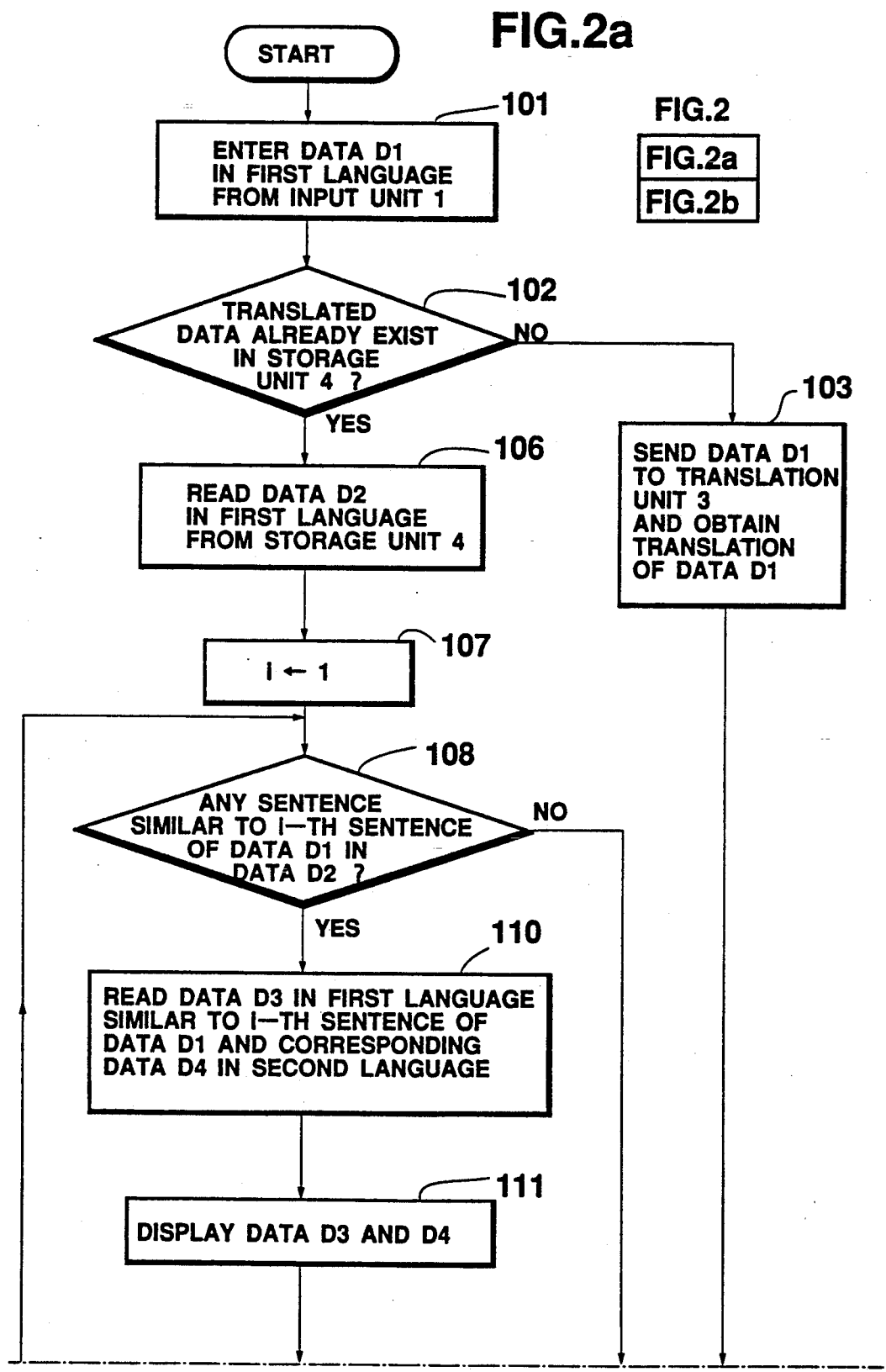

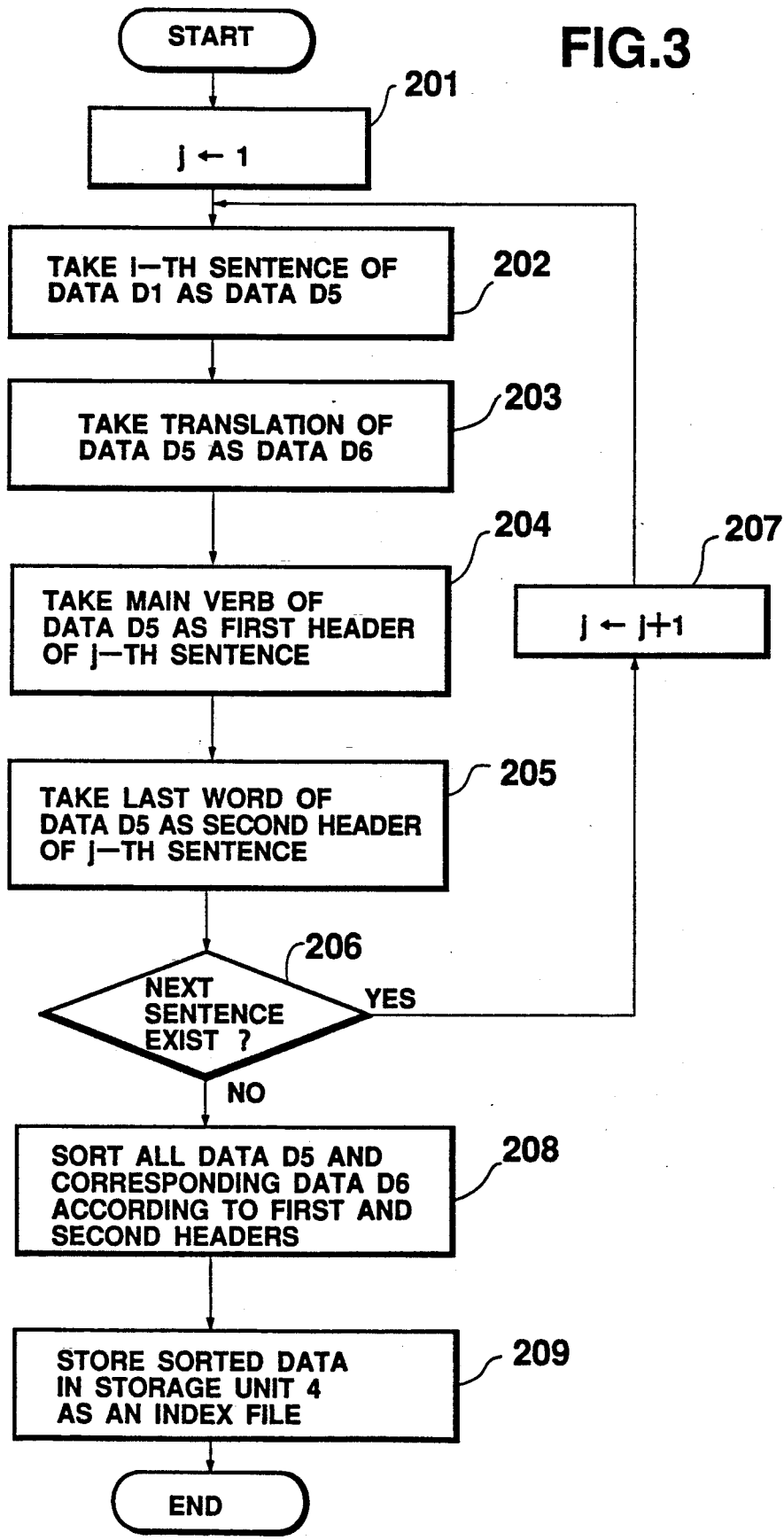

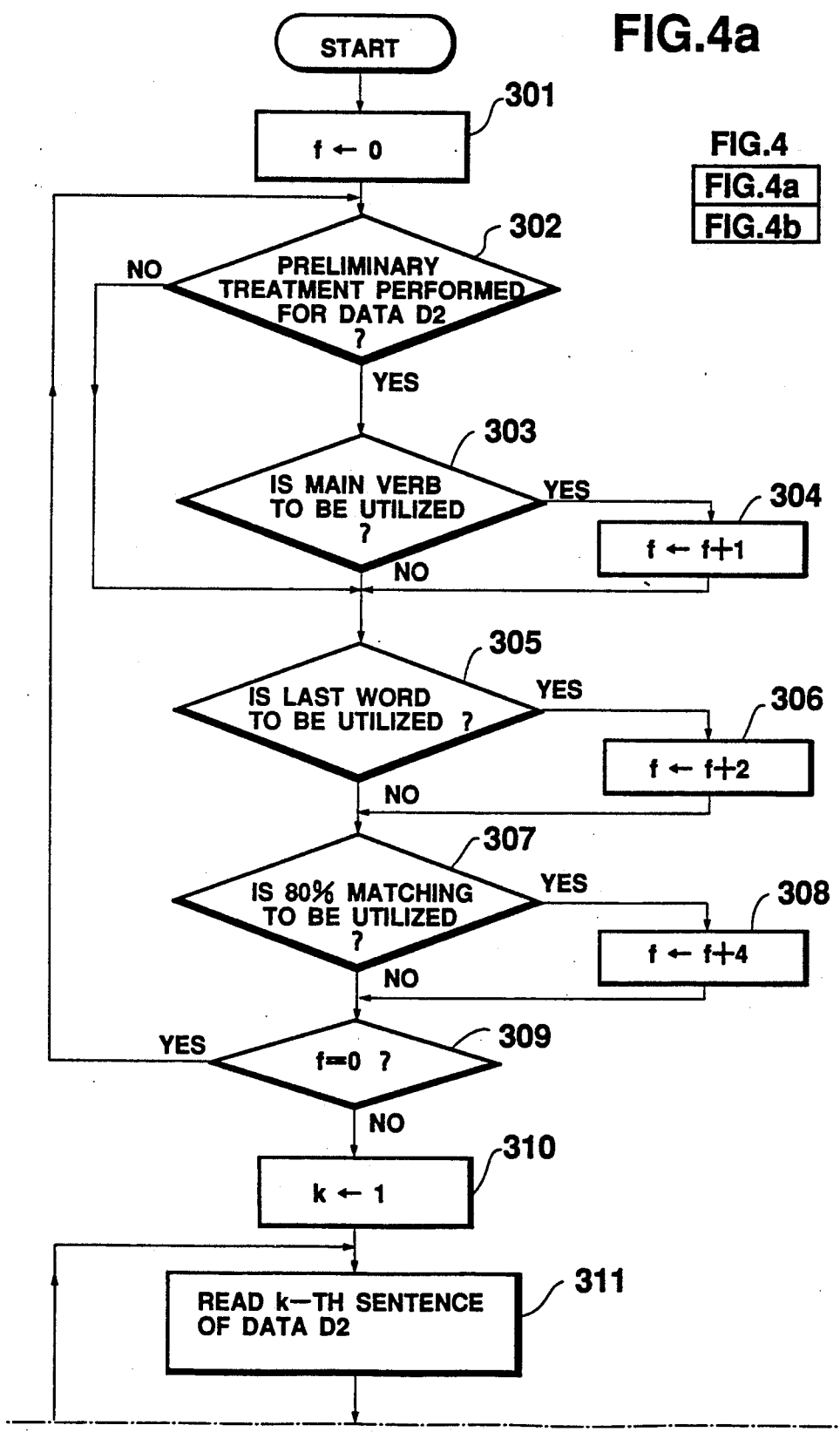

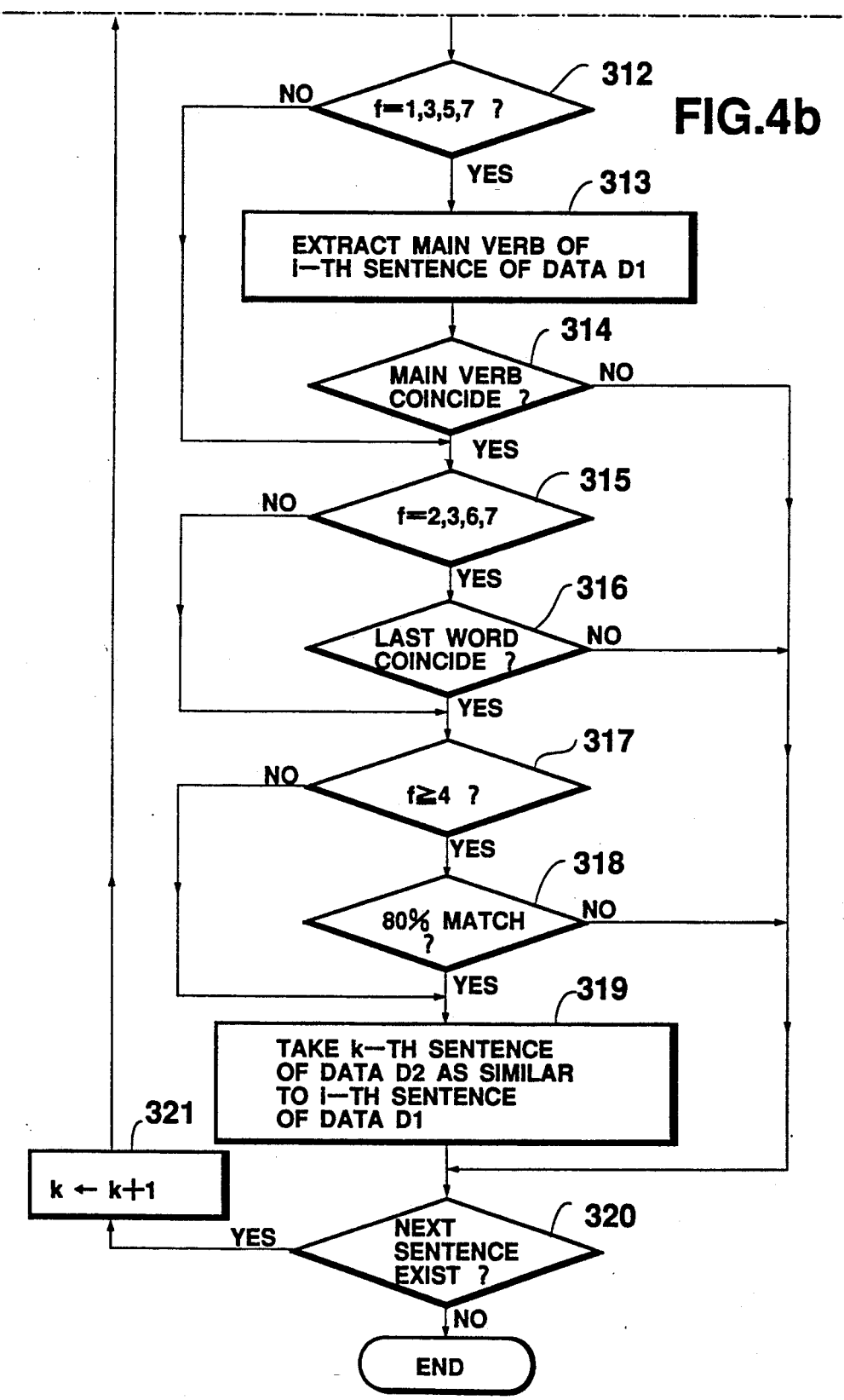

FIG.5 (A)

原文: We enjoyed having good
(Original) times together.

FIG.5 (B)

原文: We enjoyed having good
(Original) times together.

類似文 1: They enjoyed travelling
(Similar together.
sentences) [彼らは一緒に旅することを楽しんだ。]

2: He enjoyed a delicious
dinner.
[彼らは美味しい夕食を楽しんだ。]

どの文を利用しますか？
(Which sentence do you want to utilize ?)

FIG.5 (C)

原文: We enjoyed having good
(Original) times together.

類似文 1: They enjoyed travelling
(Similar together.
sentences) [彼らは一緒に旅することを楽しんだ。]

訳文: 私達は一緒に良い時を
(Translation) 過ごすことを楽しんだ。

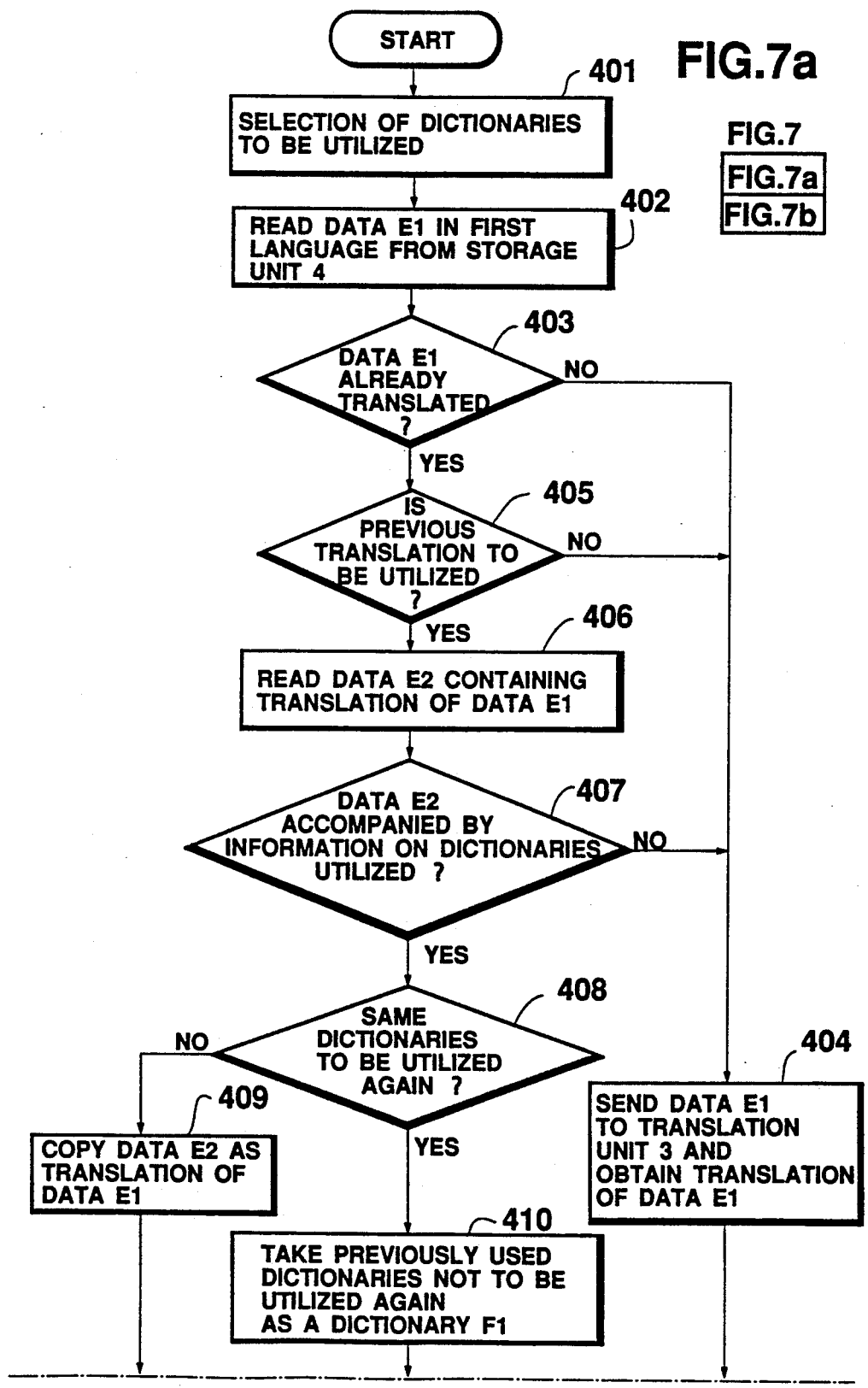

FIG.8 (A)

| A1 | A2 | A3 | A4 | A5 | A6 | A7 | A8 | A9 | A10 |
|----|----|----|----|----|----|----|----|----|-----|
|    |    |    |    |    |    |    |    |    |     |

FIG.8 (B)

| B1 | B2 | B3 | B4 | B5 | B6 | B7 | B8 | B9 | B10 |
|----|----|----|----|----|----|----|----|----|-----|
| J3 | J3 | J3 | J3 | J3 | J3 | J3 | J3 | J3 | J3 |
| J1 |    | J1 |    |    | J1 |    |    | J1 |    |
| J3 |    | J2 |    |    | J2 |    |    | J3 |    |
|    |    | J3 |    |    | J3 |    |    |    |    |

FIG.8 (C)

| C1 | B2 | C3 | B4 | B5 | C6 | B7 | B8 | C9 | B10 |
|----|----|----|----|----|----|----|----|----|-----|
| J3 | J3 | J3 | J3 | J3 | J3 | J3 | J3 | J3 | J3 |
| J4 |    | J5 |    |    | J4 |    |    | J4 |    |
| J3 |    | J3 |    |    | J3 |    |    | J3 |    |
|    |    |    |    |    | J5 |    |    |    |    |

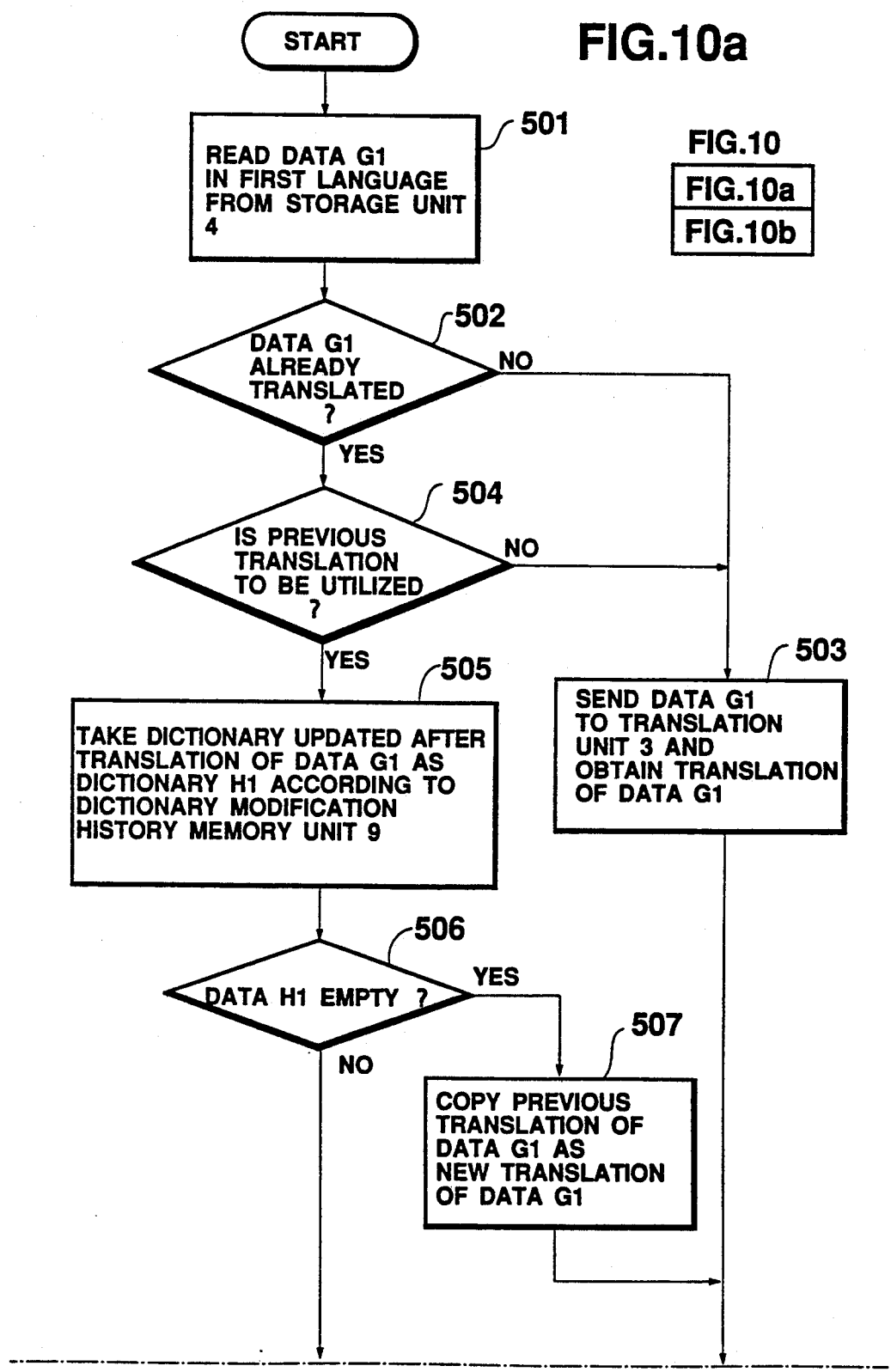

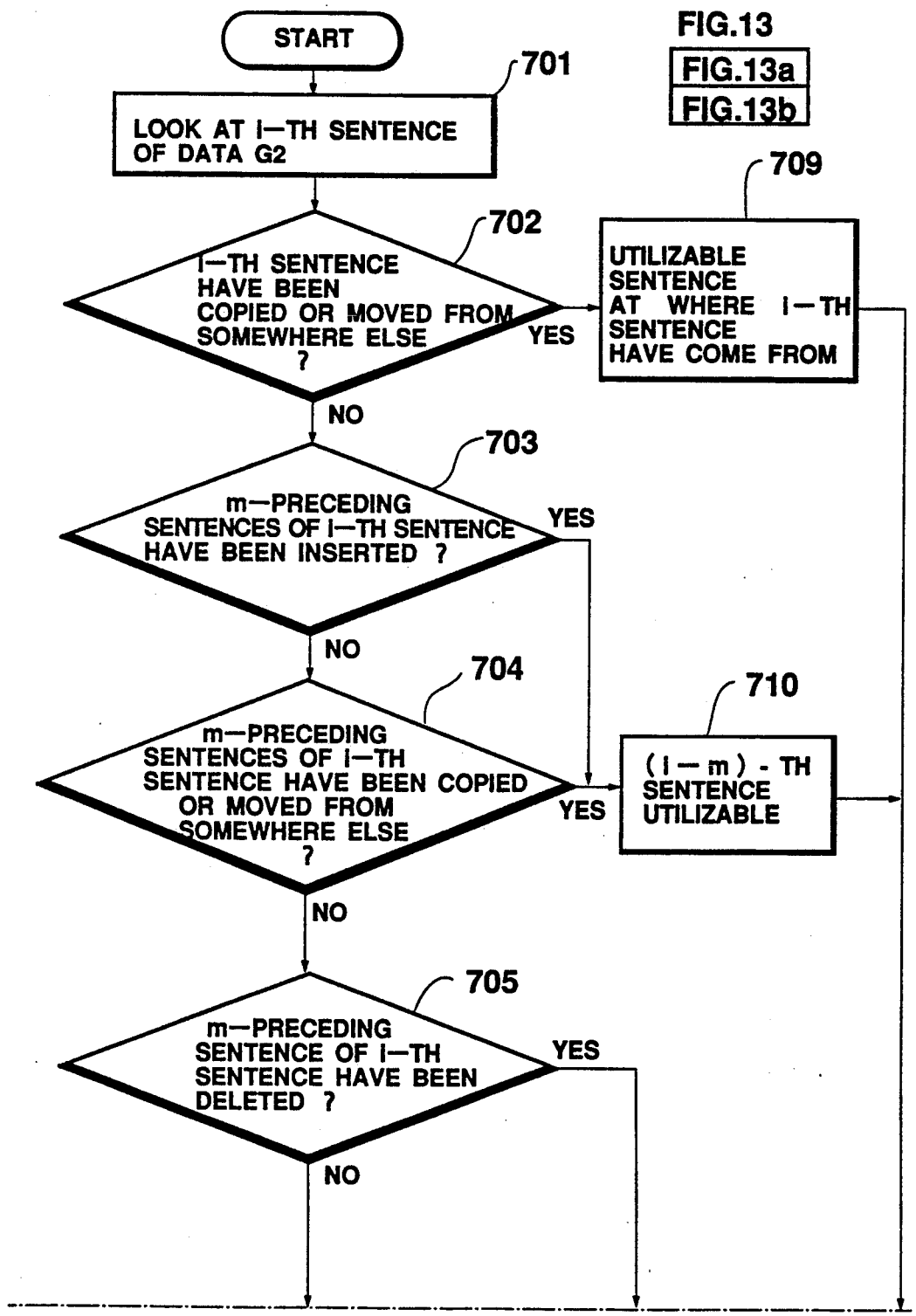

FIG.14 (A)

```
In this issue.
How to use this book.
The quick way to work it out is ·····
```

FIG.14 (B)

```
<1>
In this issue.
<2>
How to use this book.
<3>
The quick way ·····
```
| 本誌に |
| この本の使い方 |
| ············ |

FIG.14 (C)

```
<1>
In this issue.
<2>
How to use this book.
<3>
The quick way ·····
```
| 本誌の内容 |
| この本の使用法 |
| ············ |

FIG.14 (D)

In this issue.
Chapter 1. Abstract
How to use this book.
The quick way ......

FIG.14 (E)

<1>
In this issue.
<2>
Chapter 1. Abstract
<3>
How to use this book.
<4>
The quick way ......

本誌の内容

第1章 概略

この本の使用法

METHOD AND APPARATUS FOR MACHINE TRANSLATION UTILIZING PREVIOUSLY TRANSLATED DOCUMENTS

BACKGROUND OF THE INVENTION

1. Field of the Invention

The present invention relates to a method and an apparatus for machine translation for translating a document in a first language into a document in a second language.

2. Description of the Background Art

Lately, machine translation apparatus for carrying out automatic translation has attracted much attention. In this apparatus, it is possible to record an original document and a translated document in sentence by sentence correspondence, and to modify the translated document in this sentence by sentence correspondence. Also, such a machine translation apparatus is often employed as a translation assistance system in which the translated document obtained by the machine translation apparatus is inspected and modified if necessary by the human translator.

In such machine translation, there appear situations in which sentences similar to other sentences already translated are encountered, which become especially frequent in a case dealing with a large amount of documents.

However, in a conventional machine translation apparatus and method, the translation is carried out for each sentence independently, so that similar inspections and the modifications have to be repeated for each of the similar sentences. Thus, with regard to similar sentences occurring repeatedly, the conventional machine translation apparatus and method have been rather inefficient.

The conventional machine translation apparatus and method are also associated with the following problems related to the one just mentioned.

Namely, a dictionary to be utilized in carrying out the translation, which stores words and expressions in a first language in correspondence with appropriate translations in a second language of these words and expressions, is usually made to be modifiable by an operator so as to be able to improve the effectiveness of the translation. Now, in a conventional machine translation apparatus, when such a dictionary is modified during the course of translation of certain data comprising plurality of documents, those documents which have already been translated at the time of the modification of that dictionary need to be translated all over again using the modified dictionary, in order to maintain consistency within the data. This re-translation conventionally is done for the entire document regardless of the extent of the modification, so that in effect, when the modifications are relatively small in number, exactly the same translation have to be re-performed for a large portion of the entire documents. This obviously made a conventional machine translation apparatus quite inefficient in situations like these.

Another situation similar to this one arises as follows. That is, the machine translation apparatus often employs more than one dictionary, such as a general purpose dictionary and various specialized terminology dictionaries, from which appropriate ones are selected for different documents. Now, conventionally, when such use of more than one dictionaries is involved, it was not possible to know which one of the dictionaries had been used in translating each word or expression of the document, so that in inspecting the translation it has often been difficult for an operator to decide whether modification is necessary since the operator is usually not required to be thoroughly acquainted with the specialized terminologies. Moreover, as the number of documents increases, there appear situations in which similar sentences are to be translated with different choices of specialized terminology dictionaries as they belong to different technical fields. In such a case, entire sentences have to be re-translated a number of times using a different specialized terminology dictionary, even when a large portion of these sentences are identical when translated using the general purpose dictionary. Again, this made the conventional machine translation apparatus quite inefficient.

SUMMARY OF THE INVENTION

It is therefore an object for the present invention to provide a method and an apparatus of machine translation capable of dealing efficiently with situations which conventionally required repetitions for similar translations.

According to one aspect of the present invention there is provided a method of machine translation, comprising the steps of: (a) translating each original document in a first language into a corresponding translated document in a second language; (b) storing all the original documents and the translated documents in corresponding arrangements; (c) for each new original document to be translated, searching the original documents stored at the step (b) which are utilizable in translation of the new original document to be translated; and (d) translating the new original document to be translated by utilizing the stored translated documents corresponding to the stored original document found at the step (c).

According to another aspect of the present invention there is provided an apparatus for machine translation, comprising: means for translating each original document in a first language into a corresponding translated document in a second language; means for storing all the original documents and the translated documents in corresponding arrangements; means for searching, for each new original document to be translated, the original documents stored in the storing means which are utilizable in translation of the new original document to be translated; and means for controlling the translating means such that the translation of the new original document to be translated is carried out by utilizing the stored translated documents corresponding to the stored original document found by the searching means.

Other features and advantages of the present invention will become apparent from the following description taken in conjunction with the accompanying drawings.

BRIEF DESCRIPTION OF THE DRAWINGS

FIG. 1 is a schematic block diagram of a first embodiment of a machine translation apparatus according to the present invention.

FIG. 2 shows the manner of combining FIGS. 2a and 2b;

FIGS. 2a and 2b taken together constitute an overall flow chart for the operation of translation controller unit of the first embodiment of FIG. 1.

FIG. 3 is a detailed flow chart for one step in the operation of the translation controller unit of the first embodiment of FIG. 1.

FIG. 4 shows the manner of combining FIGS. 4a and 4b;

FIGS. 4a and 4b taken together constitute a detailed flow chart for another step in the operation of the translation controller unit of the first embodiment of FIG. 1.

FIGS. 5(A), (B) and (C) are illustrations of displays by the first embodiment of FIG. 1 for explaining its operation.

FIG. 7 shows the manner of combining FIGS. 7a and 7b.

FIGS. 7a and 7b taken together constitute a flow chart for the operation of a translation controller unit of the second embodiment of FIG. 6.

FIGS. 8(A), (B) and (C) are illustrations of displays by the second embodiment of FIG. 6 for explaining its operation.

FIG. 10 shows the manner of combining FIGS. 10a and 10b.

FIGS. 10a and 10b taken together constitute a flow chart for the operation of a translation controller unit of the third embodiment of FIG. 9.

FIG. 12 shows the manner of combining FIGS. 12a and 12b.

FIG. 13 shows the manner of combining FIGS. 13a and 13b.

FIGS. 13a and 13b taken together constitute a detailed flow chart for one step in the operation of the translation controller unit of the fourth embodiment of FIG. 11.

FIGS. 14(A), (B), (C), (D) and (E) are illustrations of displays by the fourth embodiment of FIG. 11 for explaining its operation.

DETAILED DESCRIPTION OF THE PREFERRED EMBODIMENTS

Figure 2B:
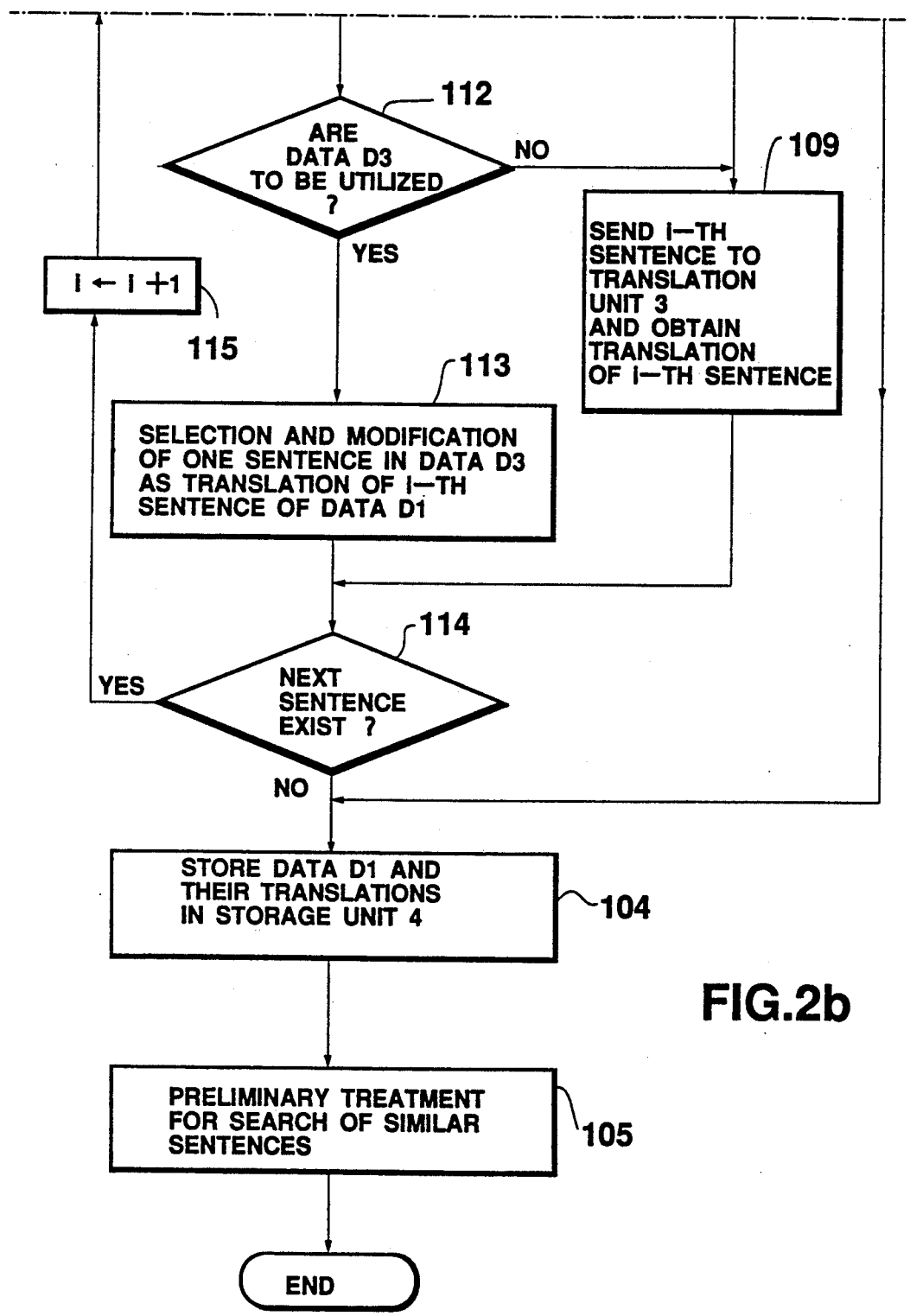

Referring now to FIG. 1, there is shown a first embodiment of a machine translation apparatus according to the present invention.

In this first embodiment, the machine translation apparatus comprises an input unit 1 for entering original data in a first language to be translated into a second language, such as a keyboard, a display unit 2 for displaying the original data as well as translated data obtained by the machine translation apparatus, such as a CRT display, a translation unit 3 for carrying out translation from the first language to the second language, a storage unit 4 for storing the original data in the first language and the translated data in the second language separately as well as in sentence by sentence correspondence, and a translation controller unit 5 for controlling other elements of this machine translation apparatus.

The translation controller unit 5 in this embodiment functions, in addition to the usual manner for a translation controller unit of a conventional machine translation apparatus, to compare every original item of data in the first language entered from the input unit 1 with those original data in the first language stored in the storage unit 4 in sentence by sentence correspondence with corresponding translated data in the second language, and to display on the display unit 2 the corresponding translated data in the second language of such original data in the first language which are judged to be similar to the original data in the first language entered from the input unit 1 as candidates for the translated data in the second language corresponding to that original data in the first language entered from the input unit 1. The translated data in the second language corresponding to the original data in the first language entered from the input unit 1 are then specified by an operator either by selecting an appropriate one from a number of candidates, or by modifying the candidate translated data in the second language displayed on the display unit 2.

More specifically, such operations of the translation control unit 5 of this embodiment of a machine translation apparatus are carried out according to the flow chart of FIGS. 2a and 2b as follows.

First, when data D1 in the first language are entered from the input unit 1 at the step 101, whether there are any previously translated data stored in the storage unit 4 is checked at step 102. If the previously translated data are not stored in the storage unit 4, then the data D1 are sent to the translation unit 3 to obtain translation in the second language at the step 103, the data D1 and the obtained translation are stored in the storage unit 4 at the step 104 and are given a preliminary treatment for the sake of search of similar sentences to be performed later on for other sentences at the step 105 which will be explained in detail below. On the other hand, if the previously translated data are stored in the storage unit 4, data D2 comprising all of these previously translated data in the storage unit 4 are read out at the step 106.

Then, by using a counter i at the steps 107, 114 and 115, whether there is any sentence in the data D2 which is similar to an i-th sentence of the data D1 is determined at the step 108, for every sentence in the data D1. A detail of this determination of the similar sentence will be explained below. If there is no sentence in the data D2 which is similar to the i-th sentence of the data D1, then this i-th sentence is sent to the translation unit 3 to obtain translation in the second language at the step 109. On the other hand, if there exists at least one sentence in the data D2 which is similar to the i-th sentence of the data D1, then data D3 comprising all such sentences in the data D2 which are similar to the i-th sentence of the data D1 as well as data D4 comprising translations corresponding to the sentences of the data D3 are read out at the step 110, and are displayed at the display unit 2 with sentence by sentence correspondence between the data D3 and data D4 at the step 111. At this point, an operator inspects the displayed data D3 and D4 and gives a command as to whether any sentences of the data D3 and data D4 are to be utilized for the translation of the i-th sentence of the data D1 at the step 112. If none of the sentences of the data D3 and data D4 are to be utilized, the process proceeds to the step 109 above in which the i-th sentence is sent to the translation unit 3 to obtain translation in the second language. If there is at least one sentence of the data D3 and data D4 to be utilized, a selection is made by the operator as to which sentence of the data D3 and data D4 are to be utilized and if necessary the selected sentence is appropriately modified at the step 113. These steps 108 to 113 are repeated for every sentence of the data D1 by the steps 114 and 115.

When all the sentences of the data D1 are translated, the data D1 and the obtained translation are stored in the storage unit 4 at the step 104 and are given a preliminary treatment for the sake of search of similar sentences to be performed later on for other sentences at the step 105 which will be explained in detail below, and then the process terminates.

The preliminary treatment for the search of similar sentences appeared at the step 105 in the flow chart of FIGS. 2a and 2b above is carried out in detail according to the flow chart of FIG. 3 as follows.

Namely, by using a counter j at the steps 201, 206 and 207, each j-th sentence of the data D1 is separately taken as data D5 at the step 202, and translation of the j-th sentence of the data D1 is separately taken as data D6 at the step 203. Then, the data D5 is morphologically analyzed to obtain a main verb of the j-th sentence of the data D1 which is taken as a first header of the data D5 at the step 204, and also the last word of the j-th sentence is taken as a second header of the data D5 at the step 205. These operations are repeated for every sentence of the data D1 by the steps 206 and 207. Then, all the data D5 and the corresponding data D6 are sorted according to the first and second headers of the data D5. The sorted data D5 and D6 are then stored in the storage unit 4 as an index file which will be looked up in the search of similar sentences in the subsequent translations. Such an index file comprises entries of a form of "main verb, last word, first language data (data D5), second language data (data D6)" for each sentence of the data D1. The creation of this index file completes the preliminary treatment for the search of similar sentences at the step 105 of the flow chart of FIG. 2b.

The search of similar sentences appearing in the flow chart of FIGS. 2a and 2b above in detail is carried out according to a flow chart of FIGS. 4a and 4b as follows.

First, with a flag f set to 0 at the step 301 initially, whether the data D2 are given the preliminary treatment is checked at the step 302. If yes, the operator is asked to give a command regarding whether a matching of main verbs of the sentences is to be utilized as a criterion to determine similar sentences at the step 303, and when this criterion is to be utilized the flag f is increased by 1 at the step 304, whereas otherwise the process proceeds directly to the step 305. At the step 305, the operator is asked to give a command regarding whether a matching of last words of the sentences is to be utilized as a criterion to determine similar sentence, and when this criterion is to be utilized the flag f is increased by 2 at the step 306, whereas otherwise the process proceeds directly to the step 307. At the step 307, the operator is asked to give a command regarding whether a matching of 80% of words of the sentences is to be utilized as a criterion to determine similar sentence, and when this criterion is to be utilized the flag f is increased by 4 at the step 308, whereas otherwise the process proceeds directly to the step 309. At the step 309, whether a value of the flag f is equal to 0 is determined. If so, the steps 302 to 308 are repeated, whereas otherwise, the process proceeds to the step 310.

Then, using a counter k at the steps 310, 320 and 321, each k-th sentence of the data D2 are read out at the step 311, and whether the value of the flag f is equal to one of 1, 3, 5, and 7 is determined at the step 312. If not, the process proceeds to the step 315 below. Otherwise, the i-th sentence of the data D1 is morphologically analyzed to extract a main verb of this i-th sentence of the data D1 at the step 313, and FIGS. 2a and 2b this extracted main verb of the i-th sentence of the data D1 is compared with the main verb of the k-th sentence of the data D2 stored in the index file to determine whether these two main verbs coincide at the step 314. If they coincide, the process proceeds to the step 315, whereas otherwise the process proceeds to the step 320 below. At the step 315, whether the value of the flag f is equal to one of 2, 3, 6, and 7 is determined. If not, the process proceeds to the step 317 below. Otherwise, the last words of the i-th sentence of the data D1 and the last word of the k-th sentence of the data D2 stored in the index file are compared with each other to determine whether these two last words coincide at the step 316. If they coincide, the process proceeds to the step 317, whereas otherwise the process proceeds to the step 320 below. At the step 317, whether the value of the flag f is greater than or equal to 4 is determined. If not, the process proceeds to the step 319 below. Otherwise, the words of the i-th sentence of the data D1 and the last word of the k-th sentence of the data D2 stored in the index file are compared with each other to determine whether at least 80% of the words of these two sentences coincide at the step 318. If they coincide, the process proceeds to the step 319, whereas otherwise the process proceeds to the step 320 below. At the step 319, the k-th sentence of the data D2 is determined to be similar to the i-th sentence of the data D1. These steps 311 to 319 are repeated for every sentence of the data D2 for each sentence of the data D1 by the steps 320 and 321.

Now, With reference to an example shown in FIGS. 5(A), (B), and (C), the operation of this first embodiment of a machine translation apparatus will be explained.

In this example, the translation is from English to Japanese and it is assumed that a number of sentences had already been translated and received the preliminary treatment for the search of the similar sentences.

Now, suppose a sentence "We enjoyed having good times together." is entered from the input unit 1 at the step 101, as shown in FIG. 5(A). Then, after the steps 102 to 107 the search for the similar sentence is performed according to the flow chart of FIG. 4 at the step 108, and the obtained similar sentences are displayed through the steps 110 and 111, as shown in FIG. 5(B). The operator may then choose to utilize one similar sentence such as "They enjoyed travelling together.", and modify its translation if necessary, through the steps 112 and 113, so as to obtain a desired translation, as shown in FIG. 5(C).

Thus, in this embodiment, the similar sentences are searched and utilized in the subsequent translation in the machine translation apparatus, so that it is possible to deal efficiently with situations which conventionally required repetitions of similar translations.

It is to be noted that in the search for similar sentences criteria other than those used in this first embodiment may be used. For example, the matching of words may be made for not just 80% but for variable percentages to be specified by the operator. Also, key words extracted from the sentences or morphological structures of the sentences may be utilized as criterion for the similarity. Moreover, more than one sentences may be utilized for the translation of one sentence. Furthermore, those sentences to be utilized as the similar sentences need not be those translated by the same machine translation apparatus and can be supplied externally.

Figure 6:
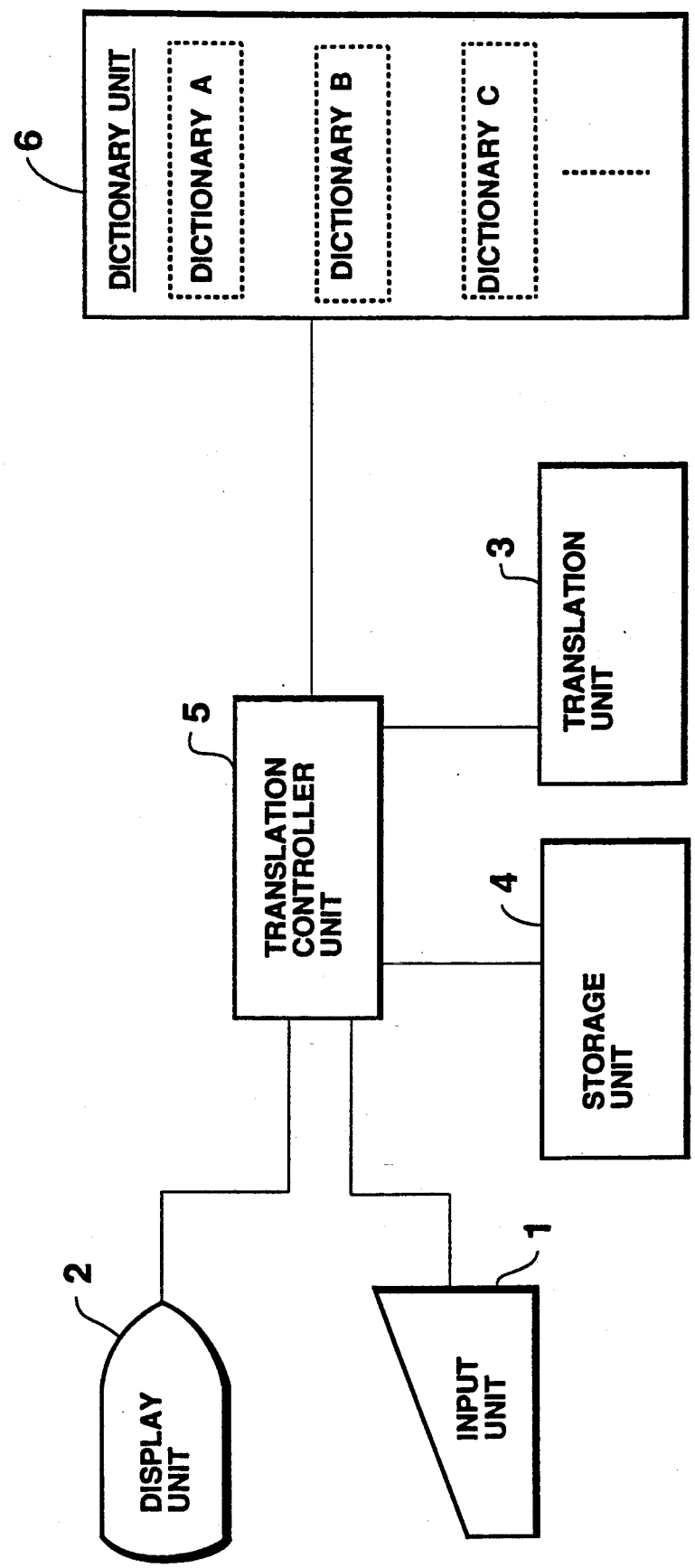
FIG. 6 is a schematic block diagram of a second embodiment of a machine translation apparatus according to the present invention.

Referring now to FIG. 6, there is shown a second embodiment of a machine translation apparatus according to the present invention. Here, those elements of the machine translation apparatus which correspond to those appeared in the first embodiment of FIG. 1 will be given the same reference numerals in this figure and their descriptions will not be repeated, except for new features not involved in the first embodiment above.

In this second embodiment, the machine translation apparatus includes a dictionary unit 6 which contains a plurality of dictionaries A, B, C, etc. to be used for the translation. Furthermore, the translation unit 3 has, in addition to the functions of the translation unit 3 of the first embodiment above, an additional function of producing information indicating which dictionary had been used for obtaining each word and expression of the translation for each sentence, along with the translations, and the storage unit 4 has, in addition to the functions of the storage unit 4 of the first embodiment above, an additional function of storing information indicating which dictionary had been used for obtaining each word and expression of the translation for each sentence, in conjunction with the translations.

In this second embodiment, when a certain sentence is to be re-translated by using different dictionaries, the translation controller unit 5 functions, in addition to usual manner of a translation controller unit of a conventional machine translation apparatus, to determine parts of the sentence which are affected by the change of the dictionaries, and to send only such parts which are affected by the change of the dictionaries to the translation unit 3 to obtain an appropriate translation, while the remaining parts of the sentence which are unaffected by the change of the dictionaries are taken directly from a previous translation.

Figure 7B:
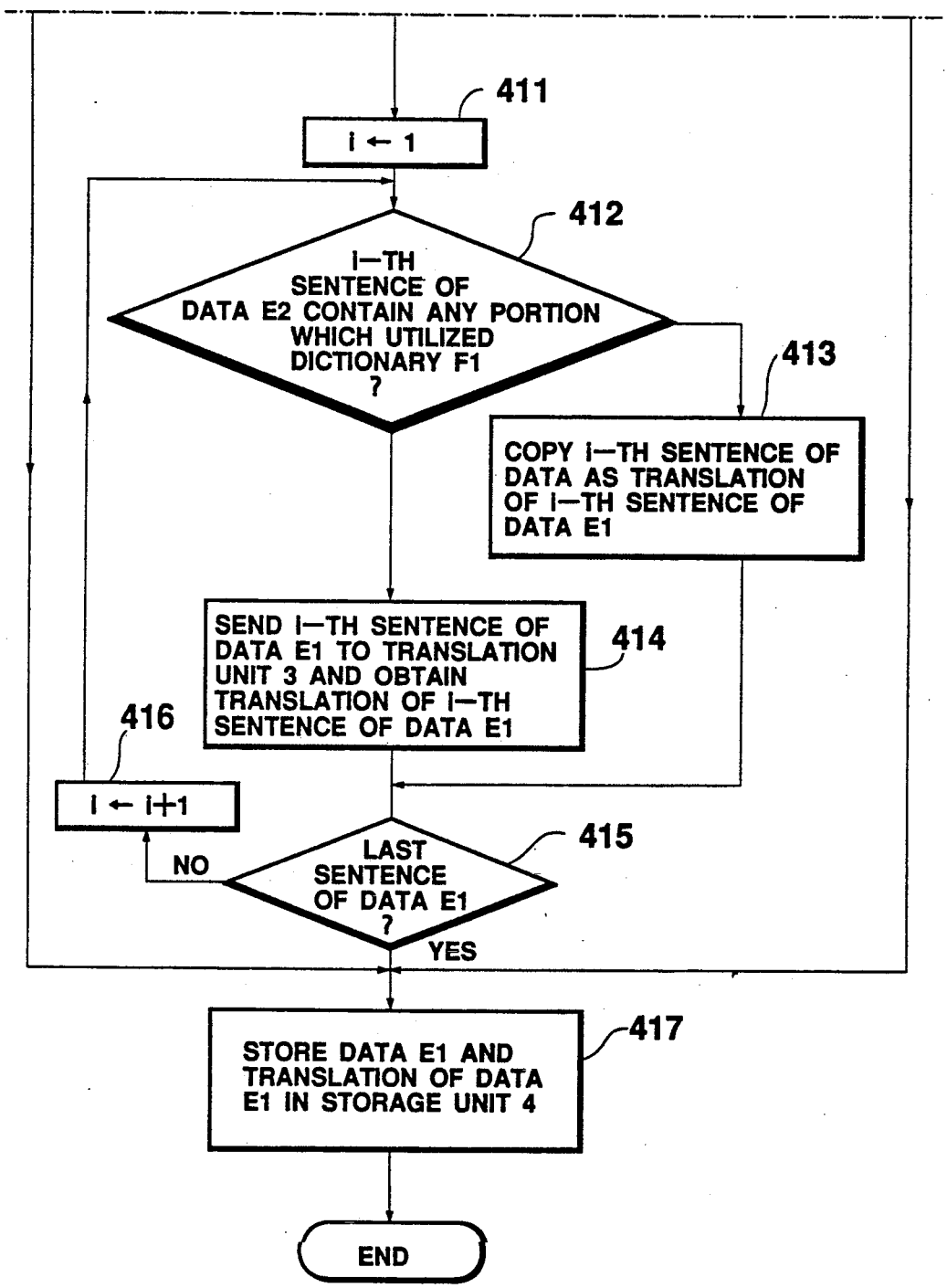

More specifically, such operations of the translation control unit 5 of this second embodiment of a machine translation apparatus are carried out according to a flow chart of FIGS. 7a and 7b as follows.

First of all, the dictionaries in the dictionary unit 6 which are to be used in the following translation operation are selected by an operator at the step 401. Then, when data E1 in the first language are entered from the input unit 1 at the step 402, whether these data E1 have been translated previously is checked at the step 403.

If the data E1 are found to have not been translated previously, then the data E1 are sent to the translation unit 3 to obtain a translation in the second language at the step 404. On the other hand, if the data E1 are found to have been translated previously, an operator is asked to give a command indicating whether the previous translation is to be utilized in this translation at the step 405.

If the previous translation is not to be utilize this time, the step 404 above will be taken next. Otherwise, data E2 containing the translation of the data E1 are read from the storage unit 4 at the step 406, and whether each sentence of these data E2 is accompanied by the information indicating the dictionaries utilized in obtaining that sentence is checked at the step 407.

If the sentences of the data E2 are not accompanied by such informations, the step 404 above will be taken next. Otherwise, an operator is asked to give a command indicating whether dictionaries to be utilized in this translation are the same as those utilized in the previous translation at the step 408.

If the dictionaries are the same, there is no need to translate the data E1 again, so that the data E2 are taken as the translation of the data E1 at the step 409. Otherwise, those dictionaries which had been utilized in the previous translation but are not to be utilized in this translation are taken collectively as a dictionary F1 at the step 410, and then by using a counter i at the steps 411, 415 and 416, for each i-th sentence of the data E2 whether there is any portion of the i-th sentence which utilized the dictionary F1 in the previous translation is determined at the step 412, in accordance with the information accompanying the data E2.

If no portion of the i-th sentence utilized the dictionary F1 in the previous translation, this i-th sentence is unaffected by the change of the dictionaries and is taken without change as a part of this translation at the step 413.

Otherwise, the i-th sentence of the data E1 corresponding to the i-th sentence of the data E2 which contains a portion utilized the dictionary F1 in the previous translation is sent to the translation unit 3 to obtain a new translation at the step 414.

These steps 412 to 414 are repeated for every sentence of the data E2 by the steps 415 and 416.

When all the sentences of the data E1 are translated, the data E1 and the obtained translation are stored in the storage unit 4 at the step 417 and the process terminates.

Now, With reference to an example shown in FIGS. 8(A), (B), and (C), the operation of this second embodiment of a machine translation apparatus will be explained.

In this example, the data E1 comprises ten sentences A1 to A10, as shown in FIG. 8(A), and the corresponding data E2 also comprises ten sentences B1 to B10, as shown in FIG. 8(B). Here, it is assumed that in the previous translation three dictionaries J1, J2, and J3 are utilized to obtain the data E2, of which the dictionary J1 is utilized for words in the sentences B1, B6 and B9, the dictionary J2 is utilized for words in the sentences B3 and B6, while the remaining portion of the data E2 are translated by utilizing the dictionary J3.

Now, suppose the same data E1 are to be translated by utilizing three dictionaries J3, J4, and J5 this time. Then, the sentences B2, B4, B5, B7, B8, and B10 can be taken from the previous translation unchanged as they had been translated by utilizing the dictionary J3 which is to be utilized again, whereas the sentences B1, B3, B6, and B9 have to be re-translated as they contain portions which had been translated by utilizing the dictionaries J1 or J2 which are not to be utilized in this translation. Consequently, the sentences B2, B4, B5, B7, B8, and B10 are taken without change for the translation of the sentences A2, A4, A5, A7, A8 and A10, while the sentences A1, A3, A6, and A9 are re-translated into the sentences C1, C3, C6, and C9, as shown in FIG. 8(C).

Thus, in this second embodiment, the sentences which are unaffected by the change of the dictionaries are searched and utilized in the subsequent translation in the machine translation apparatus, so that it is possible to deal efficiently with situations which conventionally required repetitions of similar translations.

It is to be noted that the re-translation can be made to be performed for only a part of the entire data by allowing the operator to specify a desired region for the data.

Also, a number of dictionaries to be utilized can be changed in the different translation operations.

Figure 9:
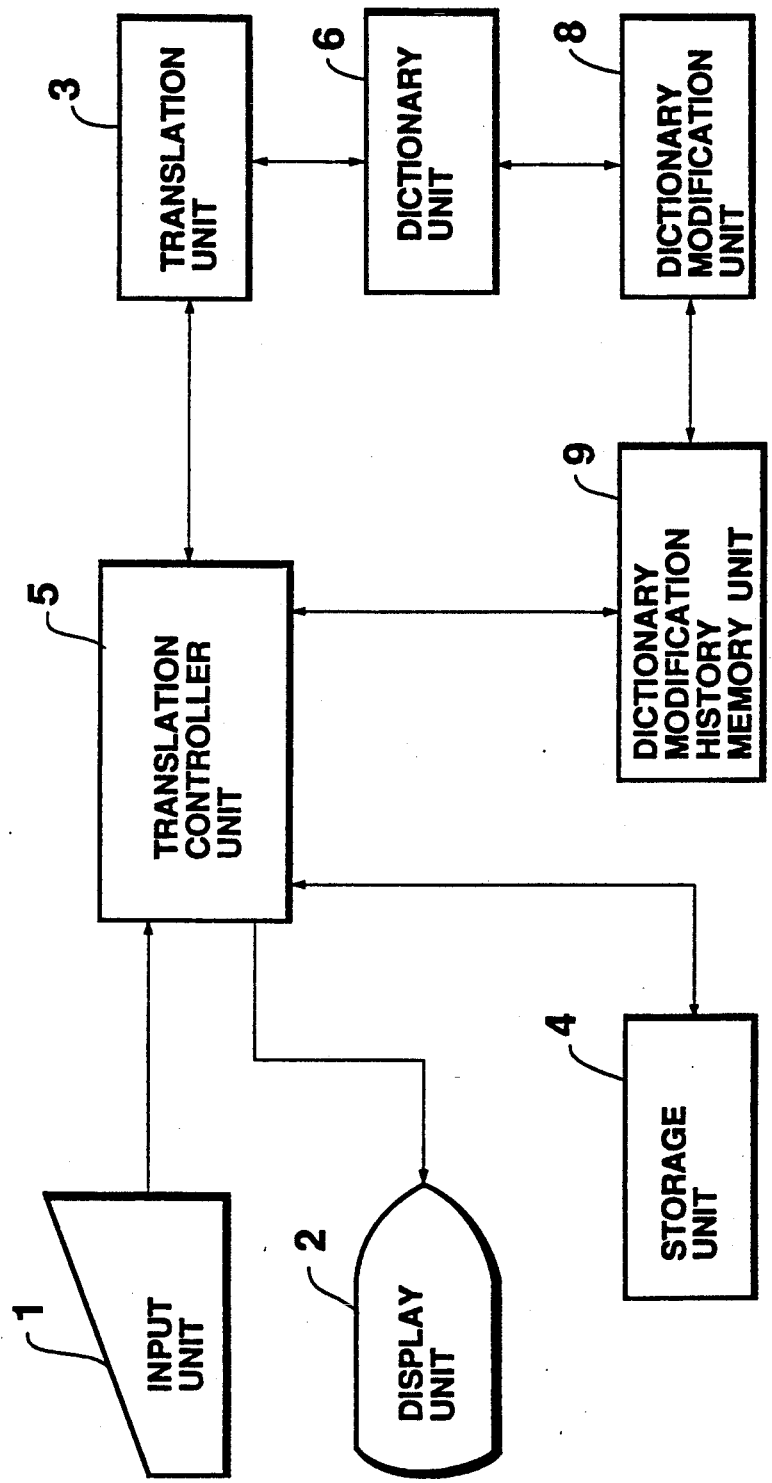
FIG. 9 is a schematic block diagram of a third embodiment of a machine translation apparatus according to the present invention.

Referring now to FIG. 9, there is shown a third embodiment of a machine translation apparatus according to the present invention. Here, those elements of the machine translation apparatus which correspond to those appeared in the first embodiment of FIG. 1 or the second embodiment of FIG. 6 will be given the same reference numerals in this figure and their descriptions will not be repeated, except for new features not involved in the first or second embodiments above.

In this third embodiment, the machine translation apparatus includes a dictionary modification unit 8 which modifies or updates the dictionaries in the dictionary unit 6, and a dictionary modification history memory unit 9 which memorizes history of the modifications and updatings performed by the dictionary modification unit 8 on the dictionary unit 6.

In this third embodiment, when a certain sentence is to be re-translated by utilizing a dictionary which has been updated since the previous translation of that sentence, the translation controller unit 5 functions, in addition to usual manner of a translation controller unit of a conventional machine translation apparatus, to determine parts of the sentence which are affected by the modification of the dictionary, and to send only such parts which are affected by the modification of the dictionary to the translation unit 3 to obtain an appropriate translation, while the remaining parts of the sentence which are unaffected by the modification of the dictionary are taken directly from a previous translation.

Figure 10B:
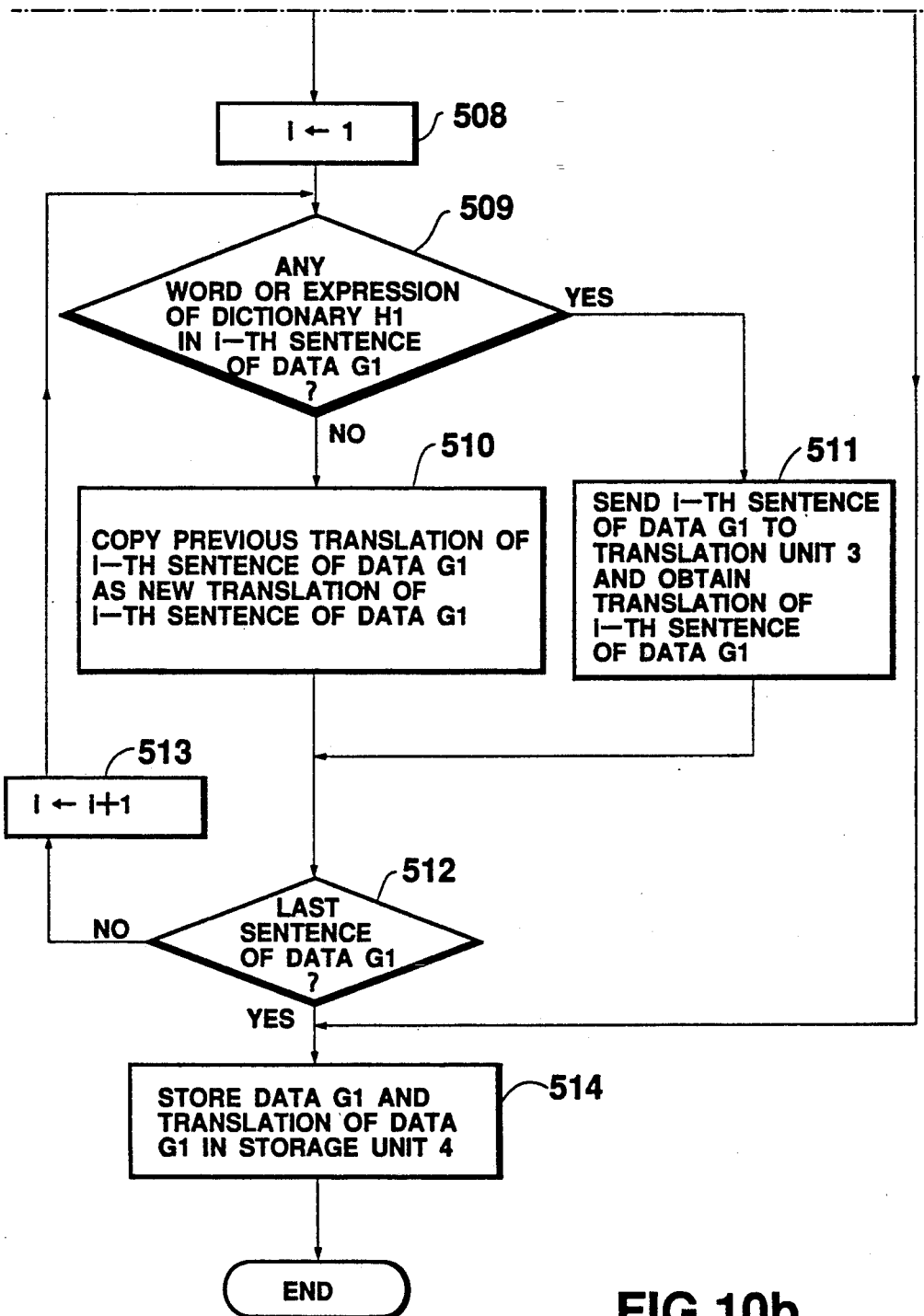

More specifically, such operations of the translation control unit 5 of this third embodiment of a machine translation apparatus are carried out according to the flow chart of FIGS. 10a and 10b as follows.

First, when data G1 in the first language are entered from the input unit 1 at the step 501, whether these data G1 have been translated previously is checked at the step 502.

If the data G1 are found to have not been translated previously, then the data G1 are sent to the translation unit 3 to obtain translation in the second language at the step 503. On the other hand, if the data G1 are found to have been translated previously, an operator is asked to give a command indicating whether the previous translation is to be utilized in this translation at the step 504.

If the previous translation is not to be utilized this time, the step 503 above will be taken next. Otherwise, all the words and expressions in the dictionary which has been modified, updated or added since the previous translation are collected as dictionary H1 at the step 505, and whether the dictionary H1 is empty or not is determined at the step 506.

If the data H1 are empty, there has been no modification, updating or addition in the dictionary since the previous translation, so that the previous translation of the data G1 are taken unchanged as the new translation at the step 507. Otherwise, by using a counter i at the steps 508, 512 and 513, for each i-th sentence of the data G1 whether there is any portion of the i-th sentence which utilized words or expressions contained in the dictionary H1 in the previous translation is determined at the step 509, in accordance with the dictionary modification history memory unit 9.

If no portion of the i-th sentence utilized the words or expressions in the dictionary H1 in the previous translation, this i-th sentence is unaffected by the modification, updating or addition of the dictionary is taken without change as a part of this translation at the step 510.

Otherwise, the translation for the i-th sentence of the data G1 will be affected by the modification, updating or addition in the dictionary, so that the i-th sentence is sent to the translation unit 3 to obtain a new translation at the step 511.

These steps 509 to 511 are repeated for every sentence of the data G1 by the steps 512 and 513.

When all the sentences of the data G1 are translated, the data G1 and the obtained translation are stored in the storage unit 4 at the step 514 and the process terminates.

Thus, in this third embodiment, the sentences which are unaffected by the modification, updating or addition made in the dictionary since the previous translation are searched and utilized in the subsequent translation in the machine translation apparatus, so that it is possible to deal efficiently with situations which conventionally required repetitions of similar translations.

It is to be noted that the determination of whether a certain word or expression has been modified, updated or added can be given conditions in terms of times or parts of speech, so that only those modification, updating or addition after a prescribed time are accounted for, or only those modification, updating or addition pertaining to a prescribed part of speech are accounted for.

Figure 11:
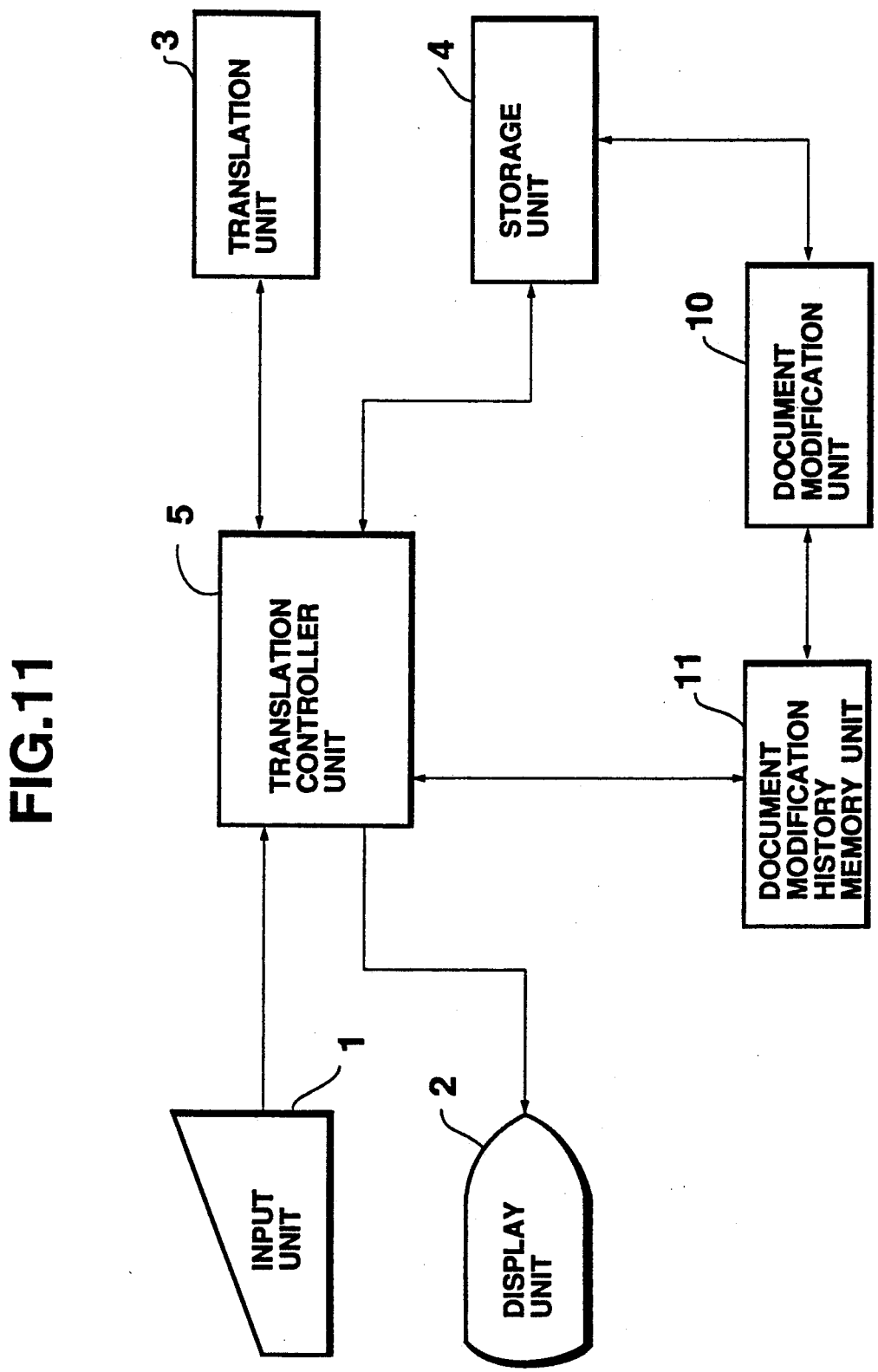
FIG. 11 is a schematic block diagram of a fourth embodiment of a machine translation apparatus according to the present invention.

Referring now to FIG. 11, there is shown a fourth embodiment of a machine translation apparatus according to the present invention. Here, those elements of the machine translation apparatus which correspond to those appeared in the first embodiment of FIG. 1, the second embodiment of FIG. 6, or the third embodiment of FIG. 9 will be given the same reference numerals in this figure and their descriptions will not be repeated, except for new features not involved in the first, second or third embodiments above.

In this fourth embodiment, the machine translation apparatus includes a document modification unit 10 which modifies the document in the storage unit 4, and a document modification history memory unit 11 which memorizes the history of the modifications performed by the document modification unit 10 on the storage unit 4.

In this fourth embodiment, when a certain sentence is to be re-translated after being modified by the document modification unit 10 since the previous translation of that sentence, the translation controller unit 5 functions, in addition to usual manner of a translation controller unit of a conventional machine translation apparatus, to search parts of the data of the previous translation which can be utilized for this translation, and to send only those parts for which the data of the previous translation cannot be utilized to the translation unit 3 to obtain an appropriate translation.

Figure 12A:
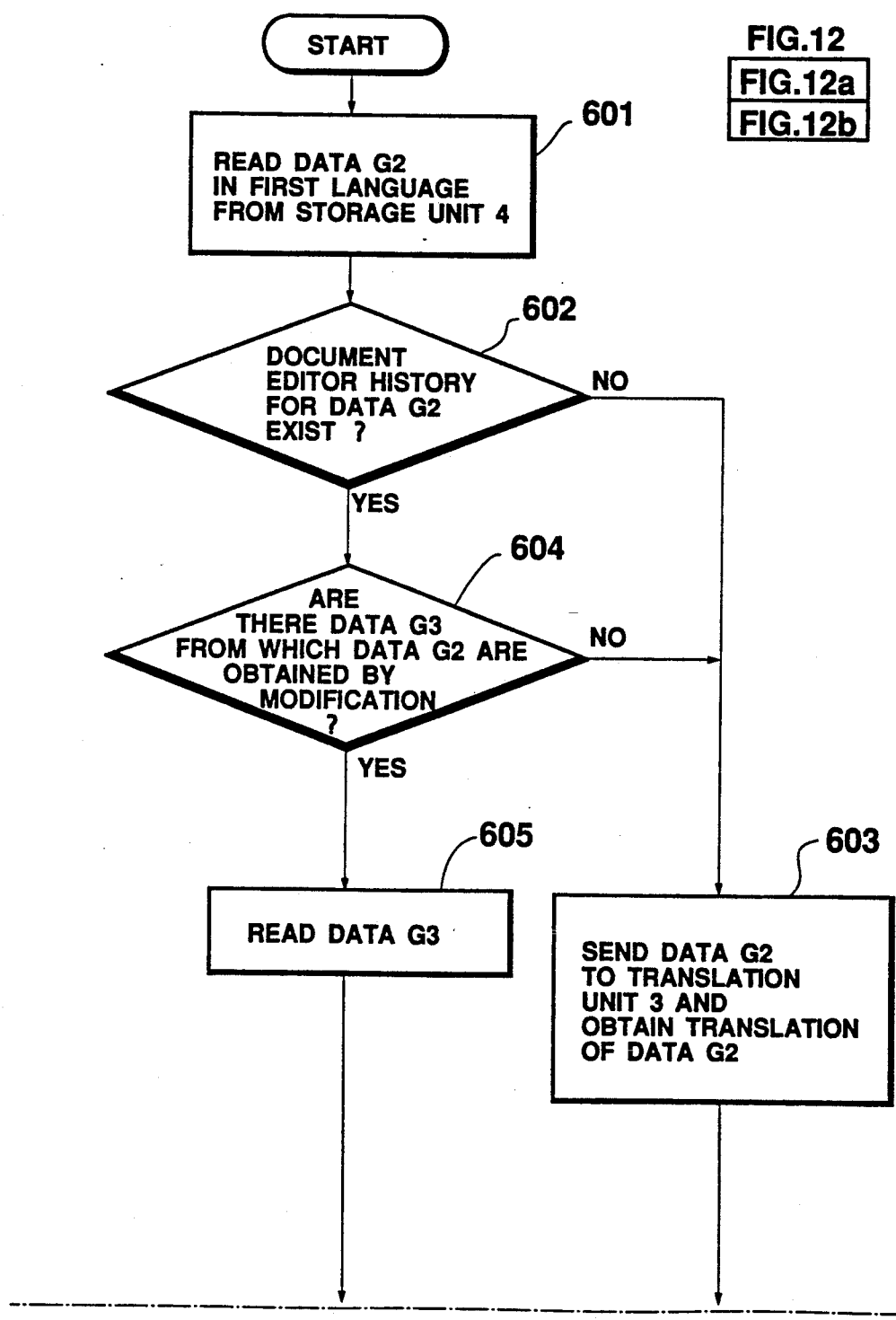
FIGS. 12a and 12b taken together constitute a flow chart for the operation of a translation controller unit of the fourth embodiment of FIG. 11.
Figure 12B:
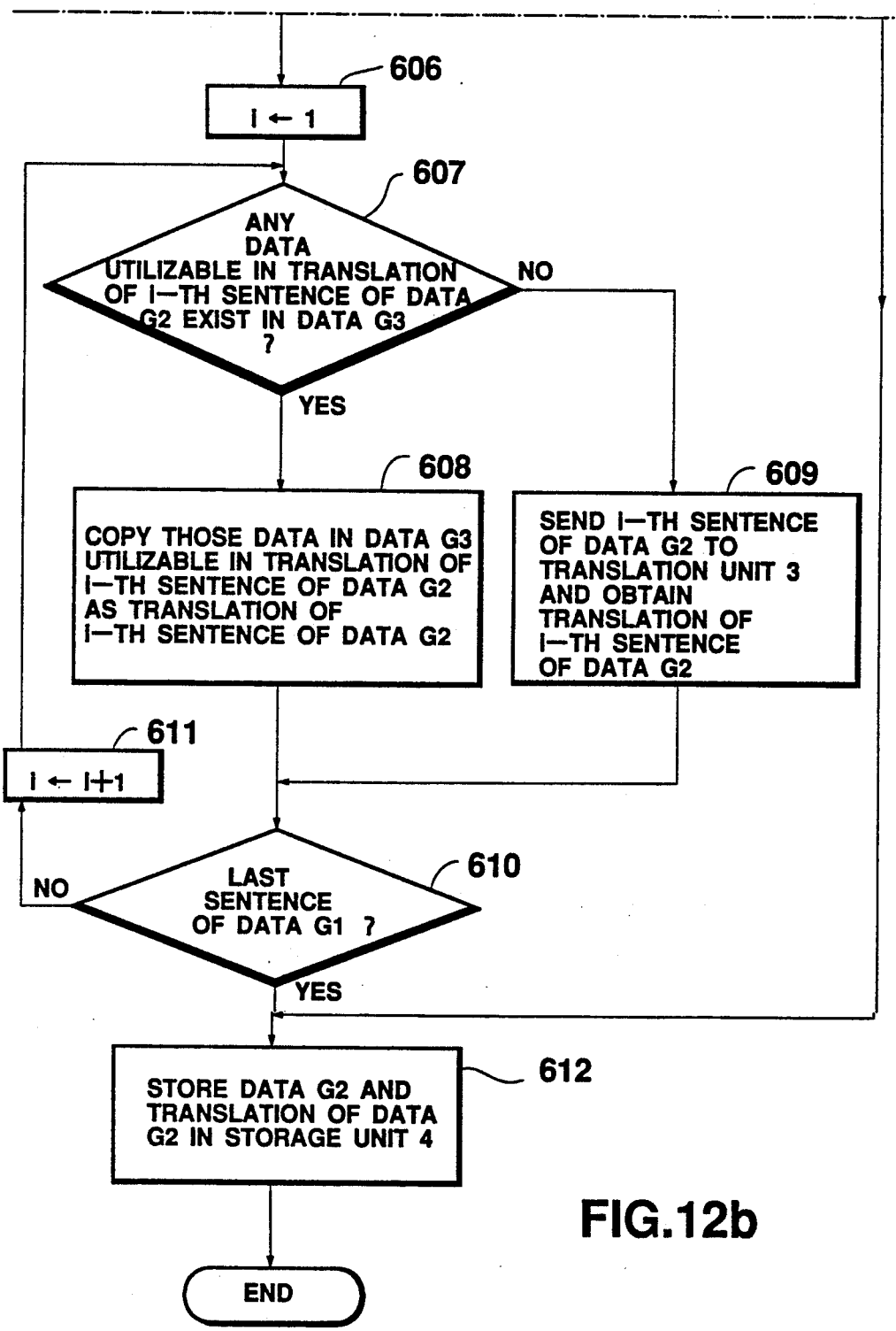

More specifically, such operations of the translation control unit 5 of this fourth embodiment of a machine translation apparatus are carried out according to the flow chart of FIGS. 12a and 12b as follows.

First, when data G2 in the first language are entered from the input unit 1 at the step 601, whether there is any document modification history for this data G2 exists in the document modification history memory unit 11 is checked at the step 602.

If the data G2 are found to have no document modification history, then the data G2 are sent to the translation unit 3 to obtain translation in the second language at the step 603. On the other hand, if the data G2 are found to have some document modification history, whether there are data G3 in the storage unit 4 from which the data G2 has been obtained by the document modification unit 10 is determined at the step 604.

If the data G3 are not present in the storage unit 4, the step 603 above will be taken next. Otherwise, the data G3 are read from the storage unit 4 at the step 605 and then by using a counter i at the steps 606, 610 and 611, for each i-th sentence of the data G2 any sentence in the data G3 which can be utilized for the translation of this i-th sentence of the data G2 is searched at the step 607. This search of the utilizable sentence will be explained in detail below.

If there is a sentence of the data G3 utilizable for the translation of the i-th sentence of the data G2, this sentence of the data G3 is taken as a translation for the i-th sentence of the data G2 at the step 608. Otherwise, the translation for the i-th sentence of the data G2 is sent to the translation unit 3 to obtain a new translation at the step 511.

These steps 607 to 609 are repeated for every sentence of the data G2 by the steps 610 and 611.

When all the sentences of the data G2 are translated, the data G2 and the obtained translation are stored in the storage unit 4 at the step 612 and the process terminates.

Figure 13B:
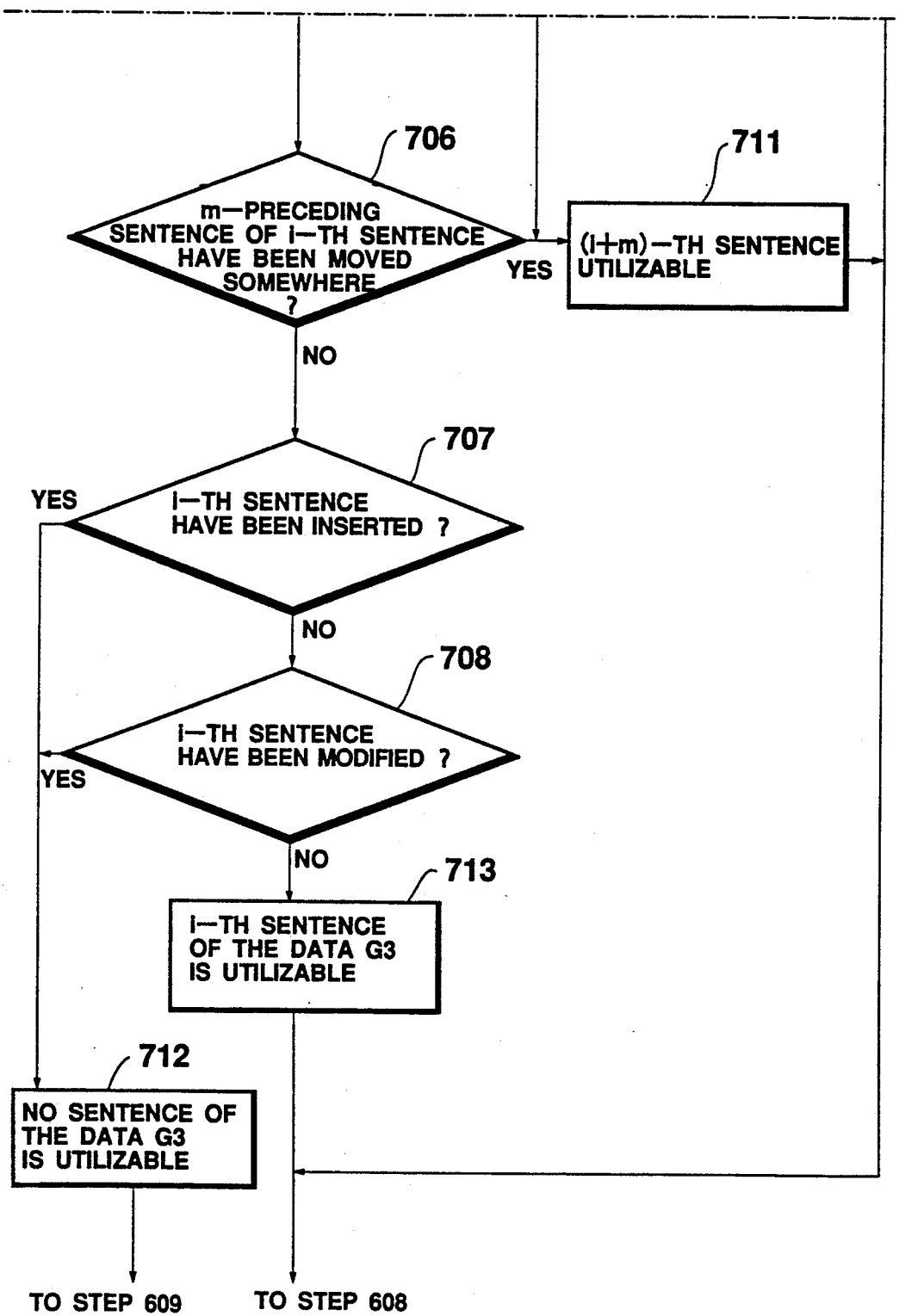

The search of the utilizable sentences appeared in the flow chart of FIGS. 12a and 12b above in detail is carried out according to a flow chart of FIGS. 13a and 13b as follows.

First, the i-th sentence of the data G2 is looked at the step 701, and whether this i-th sentence has been copied or moved from somewhere else is determined at the step 702. If so, the actually utilizable sentence is determined to be present at the location where the i-th sentence has been copied from or moved from at the step 709 and the process proceeds to the step 608 above. Otherwise, whether m-preceding sentences of the i-th sentence have been inserted is determined at the step 703. If so, the (i-m)-th sentence is determined to be utilizable at the step 710 and the process proceeds to the step 608 above. Otherwise, whether m-preceding sentences of the i-th sentence have been copied from or moved from somewhere else is determined at the step 704. If so, the (i-m)-th sentence is determined to be utilizable again at the step 710 and the process proceeds to the step 608 above. Otherwise, whether m-preceding sentences of the i-th sentence have been deleted is determined at the step 705. If so, the (i+m)-th sentence is determined to be utilizable and the process proceeds to the step 608 above. Otherwise, whether m-preceding sentences of the i-th sentence have been moved somewhere is determined at the step 706. If so, the (i+m)-th sentence is determined to be utilizable at the step 711 and the process proceeds to the step 608 above. Otherwise, whether the i-th sentence has been inserted is determined at the step 707. If so, it is determined that no sentence of the data G3 is utilizable at the step 712 and the process proceeds to the step 609 above. Otherwise, whether the i-th sentence has been modified is determined at the step 708. If so, it is determined that no sentence of the data G3 is utilizable again at the step 712 and the process proceeds to the step 609 above. Otherwise, the i-th sentence of the data G3 is determined to be utilizable at the step 713 and the process proceeds to the step 608 above.

Now, with reference to an example shown in FIGS. 14(A), (B), (C), (D) and (E), the operation of this fourth embodiment of a machine translation apparatus will be explained.

In this example, the translation is from English to Japanese, and the data to be translated are sentences shown in FIG. 14(A). An automatic translation then yielded the translation shown in the right column of FIG. 14(B). These translations were then modified in their wording as shown in FIG. 14(C). Now, when the data to be translated shown in FIG. 14(A) were modified by adding one sentence as shown in FIG. 14(D), an automatic translation now yields the translation shown in FIG. 14(E) in which the translation for the originally present sentences have been taken from the translation obtained in FIG. 14(C) according to the process of the flow chart of FIG. 12 explained above.

Thus, in this fourth embodiment, for the sentences which have been modified since the previous translation, the translation before the modification is searched and utilized whenever possible in the subsequent translation in the machine translation apparatus, so that it is possible to deal efficiently with situations which conventionally required repetitions of similar translations.

It is to be noted that the modification of the document other than insertion, deletion, moving and copying used in this embodiment may also be incorporated. Also, the sentences of the other data may be utilized in addition to the sentences of the data before the modification.

As explained, according to the embodiments described above, it is possible to deal efficiently with various situations which conventionally required repetitions of similar translations.

It is to be noted that besides those already mentioned, many modifications and variations of the above embodiments may be made without departing from the novel and advantageous features of the present invention. Accordingly, all such modifications and variations are intended to be included within the scope of the appended claims.

What is claimed is:

1. A method for machine translation, comprising the steps of:
   (a) translating original documents in a first language into corresponding translated documents in a second language, each of said original documents and said translated documents including a plurality of sentences;
   (b) storing said original documents and said translated documents in corresponding arrangements;
   (c) for each new original document of said original documents to be translated, searching said original documents stored at step (b) for previous documents of said original documents which are utilizable in translation of said new original document to be translated, where said searching is performed by using morphological, syntactic, and semantic information on said original documents; and
   (d) translating said new original document to be translated by utilizing said translated documents stored corresponding to said previous documents found at step (c).

2. The method of claim 1, wherein at the step (c), a search is performed for said original documents stored at the step (b) which are judged to be similar to said new original document to be translated.

3. The method of claim 1, wherein at step (a), translation is carried out by using a set of dictionaries comprising more than one dictionary, and wherein at step (c), a search is performed for original documents stored at step (b) which are identical to said new original document to be translated in said first language, and were translated by using a different set of said dictionaries.

4. The method of claim 1, wherein at step (a), translation is carried out by using one dictionary which is modifiable, and wherein at step (c), a search is performed for original documents stored at step (b) which are identical to said new original document to be translated in said first language, and were translated by using said dictionary modified after completion of translation of said original documents stored which are identical.

5. The method of claim 1, wherein at step (b), said original documents and said translated documents are modifiable, and wherein for said new original document to be translated which is obtained by modifying one of said original documents stored, a search is performed at step (c) for said original documents stored at step (b) to which said new original document to be translated was identical in said first language before modification.

6. An apparatus for machine translation, comprising:
means for translating original documents in a first language into corresponding translated documents in a second language, each of said original document and said translated documents including a plurality of sentences;
means for storing said original documents and said translated documents obtained by said translating means from said original documents in corresponding arrangement;
means for searching, for each new original document to be translated, said original documents stored in said storing means which are utilizable in translation of said new original document to be translated, where said searching is performed by using morphological, syntactic, and semantic information on said original documents; and
means for controlling said translating means such that said translation of said new original document to be translated is carried out by utilizing said translated documents stored in said storing means which correspond to said original documents stored in the storing means which are searched by said searching means.

7. The apparatus of claim 6, wherein said searching means searches for original documents stored in said storing means which are judged to be similar to said new original document to be translated.

8. The apparatus of claim 6, wherein said translating means carries out translation by using a set of dictionaries comprising more than one dictionary, and wherein said searching means searches for original documents stored in said storing means which are identical to said new original document to be translated in said first language, and were translated by using a different set of dictionaries.

9. The apparatus of claim 6, wherein said translating means carries out translation by using one dictionary which is modifiable, and wherein said searching means searches for original documents stored in said storing means which are identical to said new original document to be translated in said first language, and were translated by using said dictionary modified after completion of translation of said original documents stored in said storing means.

10. The apparatus of claim 6, wherein for said new original document to be translated which is obtained by modifying one of said original documents stored, said searching means searches for original documents stored in said storing means to which said new original document to be translated was identical in said first language before modification.

11. The apparatus of claim 6, further comprising: means for judging that one document is similar to another document on a basis of given criteria for similarity; and wherein said searching means searches for original documents stored in said storing means which are judged to be similar to said new original document to be translated by said judging means.

12. The apparatus of claim 6, further comprising:
dictionary means for storing a plurality of dictionaries from which a desired set of dictionaries can freely be selected; and
wherein said translating means carries out translation by using a set of dictionaries selected from said dictionary means; and
wherein said searching means searches for original documents stored in said storing means which are identical to said new original document to be translated in said first language, and were translated by using a different set of dictionaries selected from said dictionary means.

13. The apparatus of claim 6, further comprising:
means for modifying a dictionary to be utilized by said translating means in carrying out translation; and
means for recording a history of modification made on said dictionary by said modifying means; and
wherein said translating means carries out said translation by using said dictionary which is modified for different translations; and
wherein said searching means searches, in accordance with said history of modification recorded by said recording means, for original documents stored in said storing means which are identical to said new original document to be translated in said first language, and was translated by using said dictionary modified after completion of translation of said original documents stored.

14. The apparatus of claim 6, further comprising:
means for modifying documents stored in the storing means; and
means for recording history of modification made on the documents stored in the storing means by the modifying means; and
wherein for the new original document to be translated which is a obtained by modifying one of the stored original documents, the searching means searches, in accordance with the history of modification recorded by the recording means, for those original documents stored in the storing means to which the new original document to be translated was identical in the first language before the modification.

* * * * *